(12) United States Patent
Thywissen

(10) Patent No.: US 9,002,012 B2
(45) Date of Patent: Apr. 7, 2015

(54) APPARATUS AND METHOD FOR SECURING DATA IN COMPUTER STORAGE

(75) Inventor: John A. Thywissen, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1794 days.

(21) Appl. No.: 11/949,028

(22) Filed: Dec. 1, 2007

(65) Prior Publication Data

US 2009/0141902 A1   Jun. 4, 2009

(51) Int. Cl.
*G06F 21/00*   (2013.01)
*H04L 9/08*   (2006.01)

(52) U.S. Cl.
CPC ............. *H04L 9/0891* (2013.01); *H04L 9/088* (2013.01)

(58) Field of Classification Search
CPC ... G06F 21/602; G06F 21/62; G06F 21/6209; H04W 21/04
USPC ........ 380/277, 278, 279, 280; 726/26, 27, 28; 713/182, 189, 193, 191
See application file for complete search history.

(56) References Cited

U.S. PATENT DOCUMENTS

| | | | |
|---|---|---|---|
| 6,134,660 A * | 10/2000 | Boneh et al. ................... | 713/193 |
| 6,405,315 B1 * | 6/2002 | Burns et al. .................... | 713/190 |
| 6,947,556 B1 | 9/2005 | Matyas, Jr. et al. | |
| 7,111,172 B1 * | 9/2006 | Duane et al. ................... | 713/182 |
| 2001/0019614 A1 * | 9/2001 | Madoukh ........................ | 380/277 |
| 2005/0097061 A1 * | 5/2005 | Shapiro et al. .................. | 705/67 |
| 2005/0177749 A1 * | 8/2005 | Ovadia .......................... | 713/201 |
| 2006/0136732 A1 * | 6/2006 | Vandermolen ................. | 713/178 |
| 2007/0297610 A1 * | 12/2007 | Chen et al. ..................... | 380/270 |

\* cited by examiner

*Primary Examiner* — Edward Zee

(57) ABSTRACT

Apparatus, and an associated method, for maintaining data, such as a data file, in secure form. Security keys are stored and maintained at a central location. The security key is downloaded to a device that is to operate upon the data. When the security key is authorized to be downloaded to a computer device, a time boundary is associated with the security key. The time boundary defines the period of usability of the security key. The security key is used at the computer device to encrypt the data each time the data is written to storage and to decrypt the data each time the data is read from storage. Thereby, at all times, when the data is stored at storage, the data is maintained in secure form.

20 Claims, 3 Drawing Sheets

APPARATUS AND METHOD FOR SECURING DATA IN COMPUTER STORAGE

The present invention relates generally to a manner by which to secure data that is stored at, and operated-upon by, a computer station. More particularly, the present invention relates to an apparatus, and an associated method, by which automatically to encrypt and decrypt a data file when the data file is written to and read from storage, through use of a time-bounded security key.

The security key is maintained at a centralized location. An encrypted data file can be copied, in encrypted form, between different user locations. Security of the data file is maintained by controlling access to the security key. When access is granted, the access is granted in a time-bounded manner in which the time period during which the security key can be used, once accessed, is of a limited time duration.

BACKGROUND OF THE INVENTION

The use of processing devices is pervasive throughout modern society. Many business, and other, enterprises rely upon their availability and operability to perform many tasks essential to the operation of the enterprise.

Many times, groups of computer stations are interconnected into Local Area Networks (LANs), and groups of the LANs are sometimes interconnected to form Wide Area Networks (WANs). And, sometimes, computing stations are configured to permit their remote connection to another network-connected device, such as by way of a public network, such as the Internet. The ability to interconnect a computer station with a remote device, such as a computer server or other computer station of a network, permits the exchange of information therebetween. For instance, data, typically configured into a data file, is sometimes exchanged between the disparately positioned devices.

The ease with which data can be exchanged between devices, while providing many advantages to enterprise, and other, operations, also gives rise to security-related issues. If a data file includes proprietary information, the ease at which the file can be accessed, copied, or otherwise used by an unauthorized party might well compromise the proprietary nature of the data. Significant efforts, therefore, are made to control the access to the data and to take steps to prevent its unauthorized access.

Problems associated with unauthorized access to, and use of, data files is compounded by the portability of many devices capable of storing such data files. Portable computer stations, such as lap top computers, personal digital assistants, portable storage disks and drives, etc. are all exemplary of devices capable of storing data files.

In typical operation, a data file is operated upon and stored locally to facilitate query and manipulation thereof. As portable computer stations and portable storage elements are susceptible to loss or theft, efforts are made to maintain the security of stored data and data files even in the event of physical compromise, e.g., loss or theft, of any of such portable devices. More generally, irrespective of the technical form in which a data file is realized, the data requires protection, and efforts are made to prevent its compromise.

Accordingly, significant attention has been directed to controlling access to data files, wheresoever positioned. Existing solutions are generally based upon two approaches. First, end-user-managed encryption of single files is sometimes performed. And, secondly, encrypted file systems are sometimes utilized.

Various, available operating systems, e.g., UNIX, MAC OS, third-party utilities, and the Windows™ OS provide encryption and decryption functionality to encrypt and decrypt single files. Certain of these operating systems and utilities also include password management utilities.

In a typical scenario, a user writes a clear text, i.e., an unencrypted file to storage. Then, the user operates a file encrypt function, supplying an encryption key, that yields a new cyphertext, i.e., encrypted, file. The user then destroys the clear text file and stores the key that was used in the encryption procedure. Subsequently, when the user retrieves the file, the user supplies the cyphertext file and key to a decrypt function, and a clear text file is formed. Thereafter, if the file is to be written to storage again, such as subsequent to modification thereof by the user, the procedure must be repeated. This procedure, which requires manual selection by a user, is sometimes tedious. And, a user might elect not to encrypt the file. Additionally, sometimes the plain text, working copy is not securely destroyed, and the copy becomes accessible to an unauthorized party. Additionally, key management of the encryption keys that are used pursuant to the encryption and decryption is sometimes problematical. If the key is shared amongst many files, the security of that group of files is potentially reduced. And, exchange of encrypted files is sometimes difficult as the encryption key must be transmitted by way of a secure channel to prevent its compromise.

When an encrypted file system is used, an accessed file appears to a user as a normal clear text file. However, data of read and write operation is are decrypted and encrypted as the data is retrieved from, and stored to, an actual underlying physical media. Manual operations of encrypting and decrypting required in the aforementioned, end-user-managed scheme are obviated in an encrypted file system. However, conventional encrypted file systems do not permit encrypted file exchange. To send a data file to another user, or to copy data to another media without exposing the clear text, a user still must resort to the end-user-managed, single-file-encryption scheme. An additional drawback to a conventional, encrypted file system is that operating system utility software is generally unable to interpret or manipulate cipher text files. For instance, an unattended backup routine is unable to backup individual files. And, disk space reporting utilities are unable to locate large files. Additionally, disk optimizer and repair utilities generally are unable to operate on the encrypted file systems. An encrypted file system generally is not as robust as a native file system. That is to say, even a single disk error, which normally results in damage to a single file, might well result in the loss of all data in an encrypted file system. A disk error might result in the loss of all data on the device, resulting in the device being unbootable.

An improved manner by which to maintain data in secure form is therefore needed.

It is in light of this background information related to the maintenance of data in secure form that the significant improvements of the present invention have evolved.

SUMMARY OF THE INVENTION

The present invention, accordingly, advantageously provides an apparatus, and an associated method, by which to secure data that is stored at, and operated upon by, a computer station or other processing or storage device.

Through operation of an embodiment of the present invention, a manner is provided by which to encrypt and to decrypt a data file, automatically, when the data is written to storage or read from storage. The automatic nature by which the data is encrypted or decrypted obviates the need for a user manually to select the encryption or decryption operations to be performed.

In one aspect of the present invention, a key storage element is maintained at a central location, such as at a central data base. The key storage element is configured to store security keys that are used pursuant to encryption and decryption of data. A plurality of different keys are stored thereat, and access to the contents of the key storage element is controlled. By controlling access to the keys stored at the key storage element, only those authorized are able to access the key and to make use of the key.

In another aspect of the present invention, the access to the stored keys is controlled by an access controller. The access controller provides, e.g., for limited access to the stored keys and permits access to a stored key only through authentication of a request for a key. Conventional authentication, authorization, and access control schemes are, e.g., performed, such as in conjunction with a requestor.

In another aspect of the present invention, a key manager manages storage of the security keys stored at the storage element. The manager operates to select a key to retrieve and retrieves the selected securities key, stored at the storage element. The key manager operates, e.g., responsive to a request for a key once the access is granted to a requestor to retrieve a key. The key manager also, e.g., provides a time boundary to the retrieved key. That is to say, the key manager selects the time period during which the requestor is able to utilize the security key. When the time period defined by the time boundary expires, the security is no longer usable by the requestor. The time boundary is selected in any desired manner, e.g., dependent upon the requestor, the file for which the key is requested, or is a set value.

In another aspect of the present invention, an end-user device is positionable in communication connectivity with a central data base at which security keys are stored. The end user device sends a request for a security key when a file is to be operated upon. The request identifies, e.g., the file that is to be operated upon, the identity of the end user device, such as the IP address of the end user device, as well as any other information associated with the user, the device, or file for which the security key is requested for use.

In another aspect of the present invention, upon grant of the request, a security key is downloaded to the end user device. Upon delivery at the device, the security key is cached at a storage cache, such as the volatile storage of the device or a severable storage of the device, e.g., a flash drive of disk drive. The security key is accessed by the operating system of the device during its operation. When a data file is read from storage or written to storage, the stored key is retrieved and used to decrypt or encrypt the file. Thereby, when the data file is stored in storage, the data file is always in encrypted form, encrypted through operation of the security key. And, when retrieved from storage, the data file is decrypted, always to be in clear text form when operated upon by the operating system and viewed by a user of the device.

Due to the time-bounded nature of the security key, when stored at the end user device, even if the end-user device is stolen or used by an unauthorized user, the time limitation on the use of the key prevents its operation to decrypt a stored, encrypted data file beyond its time period of usability. And, if the authorization of a user, or the associated end-user device, is revoked, the key is unavailable for access by the user whose privileges have been revoked. Any file encrypted by the key by the user or under the user's authority is unable to be decrypted. Additionally, the operations conventionally performed upon a data file can be performed upon a cipher text data file. For instance, back up routines that back up files, disk utilities that scan and repair a file system, etc. operate in conventional manner irrespective of the encryption of the stored file.

In these and other aspects, therefore, an apparatus, and an associated method, is provided for a computer station to facilitate maintenance of at least a first data file in secure form. A cache is configured to store a first assigned, time-bounded key. An operator is configured to use the first assigned, time-bounded key to operate upon the first data file during a first time period.

A more complete appreciation of the scope of the present invention and the manner in which it achieves the above-noted and other improvements can be obtained by reference to the following detailed description of presently preferred embodiments taken in connection with the accompanying drawings which are briefly summarized below, and by reference to the appended claims.

DETAILED DESCRIPTION

Figure 1:
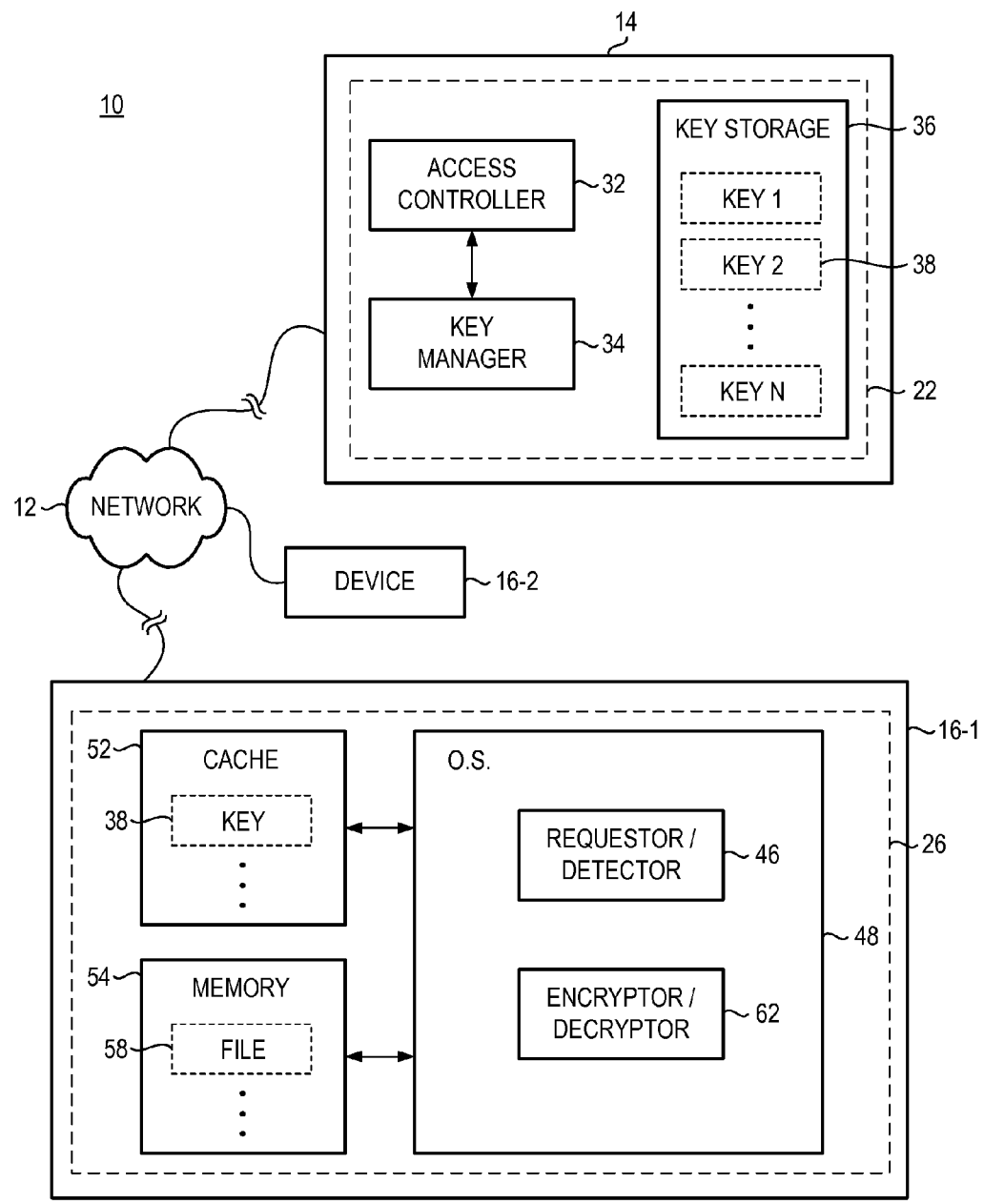
FIG. 1 illustrates a functional block diagram of an arrangement of interconnected devices at which an embodiment of the present invention is operable.

Referring first to FIG. 1, an arrangement, shown generally at 10, is shown. The arrangement includes a plurality of interconnected computer devices that are connected by way of a network 12. The network 12 comprises, for instance, the internet, and the devices 14 and 16 are representative of computer devices that are connected to the network 12. In the exemplary implementation, the device 14 forms a computer server, and the devices 16-1 and 16-2 form computer stations, such as portable computers (PCs), laptop computers, or other processing devices capable of connection to the network 12. In other implementations, the devices 14 and 16 are formed of other devices that are connectable, directly or indirectly, to the network 12. By way of their respective connections with the network 12, the devices 14 and 16 are positionable in communication connectivity. The devices 14 and 16 need not be positioned in physical proximity and, instead, are positionable at widely disparate locations that have access to the network 12. The arrangement is, for instance, representative of a business, or other, enterprise at which enterprise facilities are positioned at disparate locations, and the computer resources employed at the disparate locations are connected together by way of a network, such as the internet, or a private network.

The devices 14 and 16 include elements that are functionally represented, implementable in any desired manner, such as by algorithms executable by processing circuitry. And, while the elements are shown to be embodied within the devices 14 and 16, respectively, in other implementations, the functions carried out by such elements, the functions carried out by such elements are, in other implementations, carried out elsewhere, in a distributed manner, and operable to carry out the functions of the respective elements.

As mentioned previously, security issues are significant concern, particularly when proprietary data is stored at, and operated upon, remote devices, such as the computer station 16. Data files containing proprietary data are regularly stored at remote devices, such as laptop computers, personal computers, personal digital assistants, cell phones, etc. Due to the remote storage of the data and, sometimes, the portability of the device at which the data file is stored, the proprietary nature of the stored data is at heightened risk of compromise. And, as a stored data file is easily copied or forwarded, maintenance of the proprietary nature of the data file is made even more difficult. And, as also noted above, efforts are regularly made to secure the stored data by maintaining the data in encrypted form. Existing schemes, however, suffer from various disadvantages.

Accordingly, an embodiment of the present invention provides an improved manner by which to secure a data file to prevent its compromise by unauthorized parties. The central computer device 14 includes apparatus 22 of an embodiment of the present invention, and the computer device 16 includes apparatus 26 of an embodiment of the present invention. The apparatus 22 and 26 operate in conjunction with one another to provide improved security of data files stored at, and operated upon at, the device 16. A data file stored at the device 16, when stored, is always maintained in encrypted form to prevent access to the informational content of the stored data to only authorized parties. Limitations on access to a security key that is used to encrypt and decrypt the data significantly reduce the possibility of unauthorized access to the informational content of a data file. Encryption and decryption is performed automatically at a computer station or other device, operated by an authorized user, thereby avoiding user election not to perform encryption when reading a data file to storage.

The apparatus 22 is shown to include an access controller 32, a key manager 34, and a key storage element 36. The key storage element 36 is configured to store a plurality of security keys 38, here identified as key 1, key 2, . . . key N. The security keys comprise, for instance, multi-bit length keys comprise each of the keys 38. The keys are usable to encode, i.e., encrypt data with which the key is combined. And, the key is also usable to decode, i.e., decrypt the data out of encrypted form. The keys 38 are, for instance, maintained in a listing, indexed together with an identification number or other indexing mechanism by which to facilitate access of a specific key. Additional information associated with each of the keys is also storable at the storage element. The storage element is any of any conventional storage-types that provide for ready access to the keys stored thereat.

The key manager 34 operates to manage the storage and retrieval of the keys 38 from the key storage element 36. The key manager selects, e.g., which key to retrieve from the key storage element. Selection is made, for instance, responsive to a request for a particular key, where knowledge by the key manager of which key is required pursuant to operation upon a particular file. The request is, e.g., a request related to a particular file, and the file corresponds to, or is indexed together with, the key. The key selection scheme provides for selection of the keys, e.g., pursuant to a least-recently-used selection, a numerical selection, a random selection, etc.

In the exemplary implementation, the key manager also time-bounds a key retrieved from the key storage element. That is to say, the key manager further selects a period of operability of the retrieved key. The key is usable for encryption and decryption operations only for the period selected by the key manager. The time period is, e.g., a clock-based time or an activity-based time period, defined by initiation and termination events. Once selected and associated with a key 38, the key manager forwards, downloads, or otherwise provides an authorized entity to utilize the key for the time-bounded.

The access controller 32 operates to control access to the key manager and key storage element. The access controls access to the key manager and key storage element by determining whether to permit a request for a key to be considered by the key manager. In the exemplary implementation, the access controller utilizes authentication, authorization, and access control mechanisms by which to authenticate a requestor, authorize the request once authenticated, and then to provide access to the key manager and, in turn, the key storage element. Authentication is carried out using, e.g., a log-in and password scheme, a security handshake scheme, or any of various conventional authentication procedures used by which to ensure that the requesting device is of the proper identity and of the proper authority to permit downloading thereto of a security key.

The apparatus 26, functionally represented in FIG. 1 and embodied at the computer device 16, includes a requester and detector 46 that operates to request a security key and to detect delivery of a security key (or a denial of the request). The requester and detector operate in conjunction with operation of the Operating System (OS) 48 of the device 16 and are here represented as being subsumed therein. The requester and detector, in the exemplary implementation, comprises an extension to the operating system, such as an extension to the file system modules of the OS that operate, at least in part, responsive to instructions generated by the operating system 48 during its operation.

The device 16 includes storage, here represented as a storage cache 52 and a storage element 54. The cache 52, e.g., comprises volatile storage of the device or, alternately, another type of storage, such as a severable storage, severable from the device. When implemented as a severable device, the storage forms, for instance, a USB (Universal Serial Bus) flash storage, floppy disk storage, etc. And, the storage 54, in the exemplary implementation, comprises a disk-drive, such as a hard drive assembly. In other implementations, the storage element 54 is implemented in other manners.

During operation, the cache storage 52 is used to store security keys downloaded to the device 16. The key 38 is representative of a key stored at the cache. As noted above, a time bound is associated with the key. The time bound is associated with the key is also stored at the cache or is otherwise accessible during operation of the operating system. An exemplary file 58 is representative of files stored at the storage element 54. Typically, a large number of data files, analogous to the file 58, are stored at the storage element. The data files comprise any information-bearing file, including, e.g., text files, media files, executory files, etc. that are capable of being operated upon during operation of the operating system.

The operating system provides many functionalities and functions, including an encryptor and decryptor function 62. When encryption or decryption is invoked, the operating system operates upon a file 58 and a key 38 either to encrypt or decrypt the file. In exemplary operation, each time in which a file, either newly-created, or previously read from storage is read to storage, encryption is invoked to encrypt the file. And, the operation system invokes decryption of the file each time the file is read from storage. Encryption of the file requires a combination of the data of the file with an appropriate key 38. And, decryption of the file is performed also by combining the encrypted data of a file with an appropriate key 38. Due to the time-bounded nature of the key, upon expiration of the time bound, the key is no longer operable to decrypt a file. If, for instance, the device 16 is operated upon by an unauthorized user subsequent to the expiration time of the time bound of the key, the stored file is unable to be decrypted. And, in the event of an unauthorized copying of the file to another device, the lack of a key to decrypt the stored file prevents its decryption. Thereby, through maintenance of the security keys at a centralized location at which access to the keys is controlled, the security key cannot be obtained by an unauthorized party. And, because the file is encrypted with each right operation to storage and decrypted automatically with each read from storage, the encryption and decryption is transparent to a user of the device 16. The maintenance of the informational content of a file is secured while not requiring additional steps to be taken by a user of the device.

If, for instance, once written to storage, an encrypted file 58 is forwarded to, or copied to, the computer station 16-2, the file remains in encrypted form, the path not readable or otherwise usable, absent availability of the security key that was used to encrypt the file. The user of the computer station 16-2 is required to request, such as from the central data base 14, to request that the security key be downloaded to the computer station 16-2. Analogous authentication, or other authorization procedures are required to be carried out in order for the security key to be downloaded to the computer station 16-2. In a scenario in which the security key downloaded to the computer station 16-1 is stored at a USB flash drive, or other removable storage, removal of the storage out connection with the computer station 16-1 and into connection with the computer station 16-2 permits the security key to be used at the computer station 16-2 for so long as the time boundary of the security key does not expire.

Figure 2:
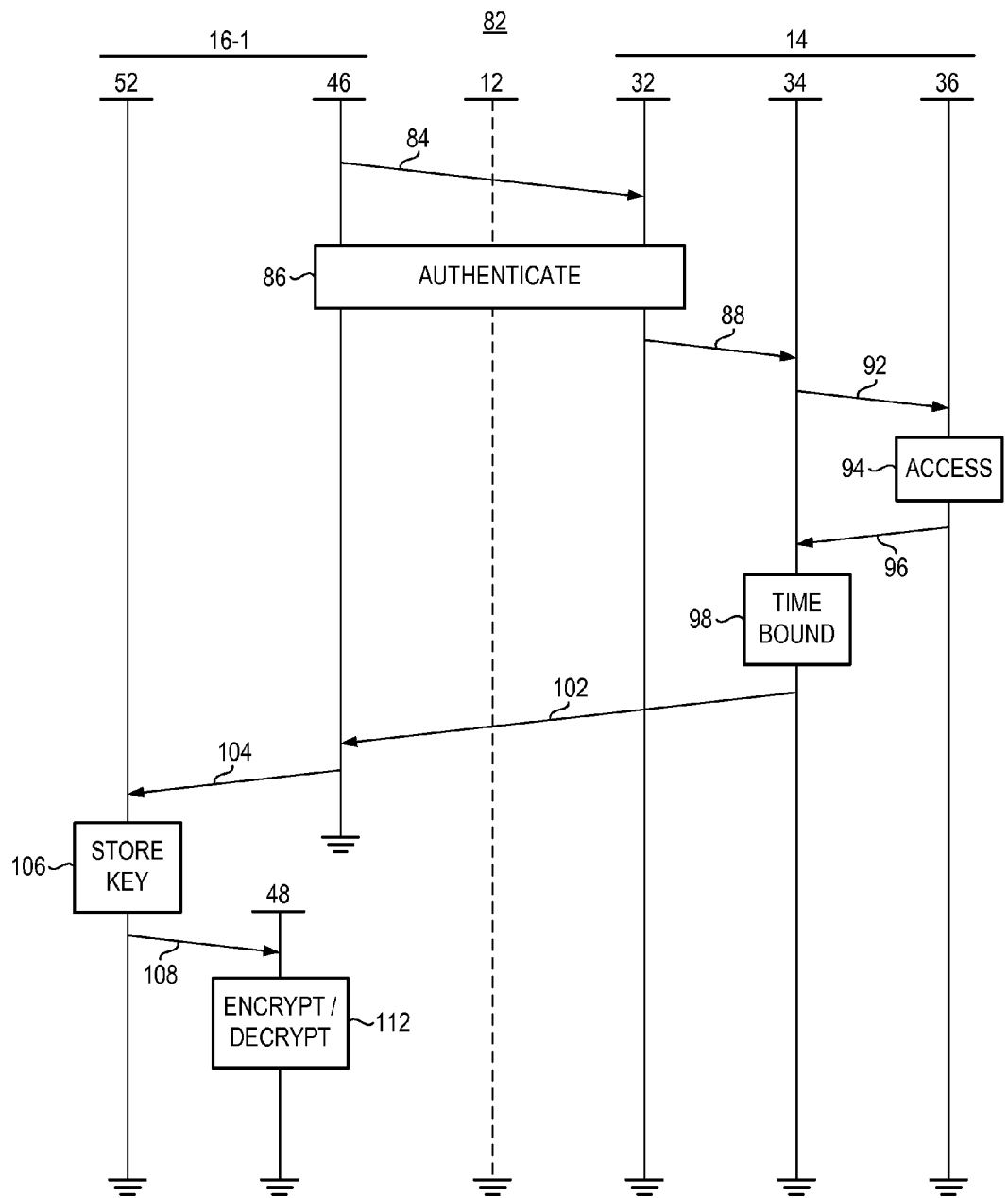
FIG. 2 illustrates a message sequence diagram representative of signaling generated during operation of the arrangement shown in FIG. 1.

FIG. 2 illustrates a signaling diagram shown generally at 82, representative of signaling generated during operation of an embodiment of the present invention, such as an embodiment corresponding to an arrangement shown in FIG. 1.

Here, when an encrypted file is to be accessed or a new file is to be created, a request is generated, indicated by the segment 84, by the requester 46 at the computer station 16-1 and sent, by way of the network 12, to the central server 14. The request is provided to an access control function. Authentication procedures, indicated by the block 86, are performed to authenticate the requesting device, i.e., the computer station 16-1. Here, the computer station is authenticated, and the request is forwarded, indicated by the segment 88, to the key manager 34 of the computer server 14. The key manager manages access to the key storage element 36. Pursuant to management operations, the manager accesses, indicated by the segment 92 and the block 94, an appropriate storage location, and retrieves, indicated by the segment 96, the selected key therefrom. The key manager operates, here indicated by the block 98, to time-bound the key. That is to say, the key manager operates to select and impose a period of usability upon the security key. To be operable, the security key must be used during its period of usability as defined by the time bound.

The selected security key, together with the time bound, is then forwarded to, i.e., downloaded, as indicated by the segment 104, to the computer station 16 and detected by the detector functionality of the requestor/detector 46. The downloaded key is provided, indicated by the segment 104, to the cache 52 and stored, indicated by the block 106, thereat. The key is then accessed and retrieved, indicated by the segment 108, pursuant to a read operation performed by the operating system to read a data file or otherwise pursuant to encryption and decryption operations indicated by the block 112. Each time a file is written to storage, a key is used to encrypt the data that is written to storage. And, each time in which an encrypted file is retrieved from storage, the key is accessed and used pursuant to decryption operations. The security key remains operable for so long as the time boundary of the security has not expired.

Figure 3:
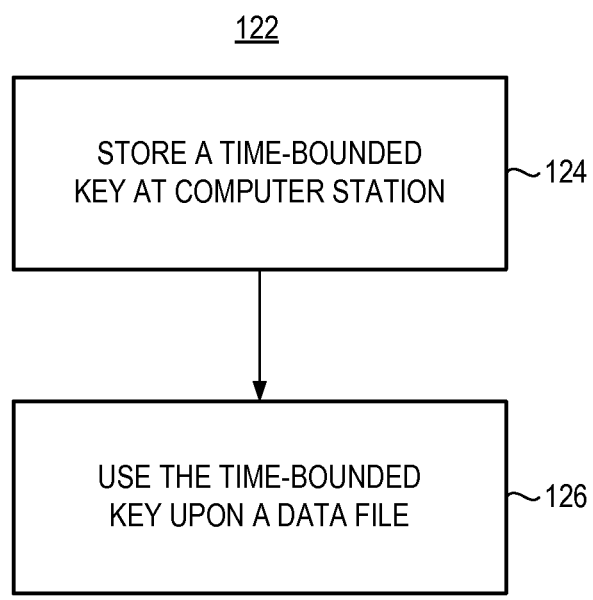
FIG. 3 illustrates a method flow diagram representative of the method of operation of an embodiment of the present invention.

FIG. 3 illustrates a method flow diagram, shown generally at 122, representative of the method of operation of an embodiment of the present invention. The method facilitates maintenance of at least a first data file in secure form at a computer station. First, and as indicated by the block 124, a first assigned, time-bounded key, is stored at a cache of the computer station. Then, and as indicated by the block 126, the time-bounded key is used to operate upon the first data file during a time period defined by the time boundary of the time-bounded key. When a data file is read from storage, the key is used to decrypt the data file. And, when a file is written to storage, the key is used to encrypt the data file. Encryption and decryption is performed automatically without user prompting.

Because of the automatic encryption and decryption of the data file, a user is not inconvenienced with a requirement to select encryption and decryption of the data. And, due to the time bounded nature of the security stored at the security station, unauthorized access to the data or compromise of the data is less likely to occur.

Presently preferred embodiments of the invention and many of its improvements and advantages have been described with a degree of particularity. The description is of preferred examples of implementing the invention and the description of preferred examples is not necessarily intended to limit the scope of the invention. The scope of the invention is defined by the following claims.

What is claimed is:

1. Apparatus for a computer station to facilitate maintenance of at least a first data file in secure form, said apparatus comprising:
   a cache configured to store a first assigned time-bounded key associated with the first data file, wherein the first assigned time-bounded key expires after a first time period;
   a key manager configured to manage storage and retrieval of the first assigned time-bound key stored at the cache, the first assigned time-bound key operable during the first time period; and
   an access controller configured to control access to an access manager and the cache, and to control to which remotely-stored and operated upon data files that time-bound keys shall be provided, wherein the first assigned time-bound key is associated with and can be used to operate on the first data file before the first time period ends and cannot be used to decrypt the first data file after the first time period ends; and
   an operator configured to use the first assigned time-bounded key to operate upon the first data file during the first time period, wherein the first assigned time-bounded key cannot be used to decrypt the first data file after the first time period.

2. The apparatus of claim 1 further comprising a key requestor configured to request assignation of the first assigned time-bounded key.

3. The apparatus of claim 2 wherein said key requestor is configured to request assignation of the first assigned time-bounded key pursuant to an authentication procedure.

4. The apparatus of claim 1 further comprising a key receiver configured to receive the first assigned time-bounded key and to provide the first assigned time-bounded key to said cache.

5. The apparatus of claim 4 wherein said key receiver is configured to receive the first assigned time-bounded key subsequent to authentication of the computer station.

6. The apparatus of claim 1 wherein said cache is further configured to store a second assigned time-bounded key and wherein said operator is further configured to use the second time-bounded key to operate upon a second data file during a second time period.

7. The apparatus of claim 1 wherein said operator is configured to encrypt the first data file.

8. The apparatus of claim 7 wherein said operator is configured to encrypt the first data file when a read operation is performed upon the first data file.

9. The apparatus of claim 8 further comprising a file storage element, and wherein said operator is configured to encrypt the first data file when the first data file is read to the file storage element.

10. The apparatus of claim 1 wherein said operator is configured to decrypt the first data file.

11. The apparatus of claim 9 wherein said operator is configured to decrypt the first data file when a write operation is performed upon the first data file.

12. The apparatus of claim 11 further comprising a file storage element, and wherein said operator is configured to decrypt the first data file when the first data file is written from the file storage element.

13. The apparatus of claim 1 wherein said cache comprises a volatile storage element.

14. The apparatus of claim 1 wherein said cache comprises a local storage medium.

15. A method for facilitating maintenance of at least a first data file in secure form at a computer station, said method comprising:
   storing a first assigned time-bounded key associated with the first data file at a cache of the computer station, wherein the first assigned time-bounded key expires after a first time period;
   managing, performed a key manager, storage and retrieval of the first assigned time-bound key stored at the cache, the first assigned time-bound key operable during the first time period; and
   controlling, performed by an access controller, access to an access manager and the cache;
   controlling, performed by the access controller, which remotely-stored and operated upon data files that time-bound keys shall be provided, wherein the first assigned time-bound key is associated with and can be used to operate on the first data file before the first time period ends and cannot be used to decrypt the first data file after the first time period ends; and
   using the first assigned time-bounded key to operate upon the first data file during the first time period, wherein the first assigned time-bounded key cannot be used to decrypt the first data file after the first time period.

16. The method of claim 15 wherein said using comprises encrypting the first data file.

17. The method of claim 16 wherein said encrypting comprises encrypting the first data file when the first data file is read to storage.

18. The method of claim 15 wherein said using comprises decrypting the first data file.

19. The method of claim 18 wherein said decrypting comprises decrypting the first data file when the first data file is written from storage.

20. An apparatus for facilitating maintenance of remotely-stored and operated-upon data files, said apparatus comprising:
   a storage element configured to store security keys;
   a key manager configured to manage storage and retrieval of the security keys stored at said storage element, the retrieved security keys operable during time-bounded periods, wherein a first security key expires after a first time period ends; and
   an access controller configured to control access to an access manager and said storage element, and to control to which remotely-stored and operated upon data files that the security keys shall be provided, wherein the first security key is associated with and can be used to operate on a first data file before the first time period ends and cannot be used to decrypt the first data file after the first time period ends.

* * * * *

UNITED STATES PATENT AND TRADEMARK OFFICE
CERTIFICATE OF CORRECTION

Page 1 of 1

PATENT NO.        : 9,002,012 B2
APPLICATION NO.   : 11/949028
DATED             : April 7, 2015
INVENTOR(S)       : Thywissen It is certified that error appears in the above-identified patent and that said Letters Patent is hereby corrected as shown below:

In the Drawings

Drawing sheet 2 of 3, reference numeral 98, lines 1-2, delete "TIME BOUND" and insert -- TIME- BOUND --, therefor.

Signed and Sealed this
Fifteenth Day of September, 2015

Michelle K. Lee
*Director of the United States Patent and Trademark Office*